July 2, 1963

J. J. GILBERT 3,095,800

INFUSION APPARATUS

Filed April 26, 1961

INVENTOR.
JACK J. GILBERT

BY
Adams, Forward and McLean
ATTORNEYS

United States Patent Office 3,095,800
Patented July 2, 1963

3,095,800
INFUSION APPARATUS
Jack J. Gilbert, Suffern, N.Y., assignor to
Simon Adler, Brooklyn, N.Y.
Filed Apr. 26, 1961, Ser. No. 105,734
3 Claims. (Cl. 99—289)

My invention relates to the preparation of solutions and suspensions by extraction of solid materials with liquids and in particular provides a device for contracting a small volume of solid material with a small volume of liquid in which, after the liquid has been removed from such contact having extracted a particular ingredient or ingredients from the solid material, the solid material is discarded preparing the device for a repeated operation of the same character.

In a more specific sense, the device of my invention is adapted to receive a solid and liquid in a contained provided with a bottom filter such that after the liquid has contacted the solid and passed through the filter both the remaining solid material and filter are removed and a fresh filter replaces the used filter. As such, the device of my invention is particularly useful in the preparation of beverages, such as coffee and tea, and has particular advantage in the repeated preparation of individual servings.

As is well known freshly brewed coffee from the standpoint of taste is far superior to coffee which has been kept heated for a period of time or which has been reheated. In restaurants and similar commercial establishments, however, the general practice is to brew a large quantity of coffee which is kept heated for a period of time, since the repeated brewing of small portions to meet continuous demand generally experienced by such establishments is an uneconomic operation. As a consequence, it is difficult in such establishments to purchase a freshly brewed cup of coffee, and one is ordinarily obliged to accept a less-than-satisfactory beverage which has lost its fresh flavor.

It is a particular object of my invention to provide a coffee brewing machine capable of semi-automatic operation to brew individual servings of coffee, as these are required. It is a further object of my invention to provide such a machine which can be operated for a long period of time with a minimum requirement of labor for refilling and the like. It is still another object of my invention to provide a coffee brewing machine or the like utilizing a strip of filter paper to retain the ground coffee as hot water is passed through it in which, after each operation, the strip of filter paper is removed both to carry the coffee grounds from the machine and at the same time to expose a fresh section of filter paper for the next operation of the machine.

These and other objects of my invention are essentially achieved employing a device having a plate in horizontal position which is apertured and over which a strip of filter paper is placed. A hollow, open-bottomed receptacle which is vertically movable is positioned on the plate over the aperture and filter paper. The coffee grounds and hot liquid in that order are discharged into the receptacle allowing the hot coffee to pass out through the filter paper and aperture in the plate. When the operation is completed, the receptacle is lifted and filter paper advanced along the plate to remove the coffee grounds from beneath the receptacle and draw fresh filter paper over the aperture. Thereafter the receptacle is lowered again in position over the fresh filter paper and the aperture for a new operation.

For a more complete understanding of the practical application of my invention, reference is made to the appended drawings in which.

Figure 1:
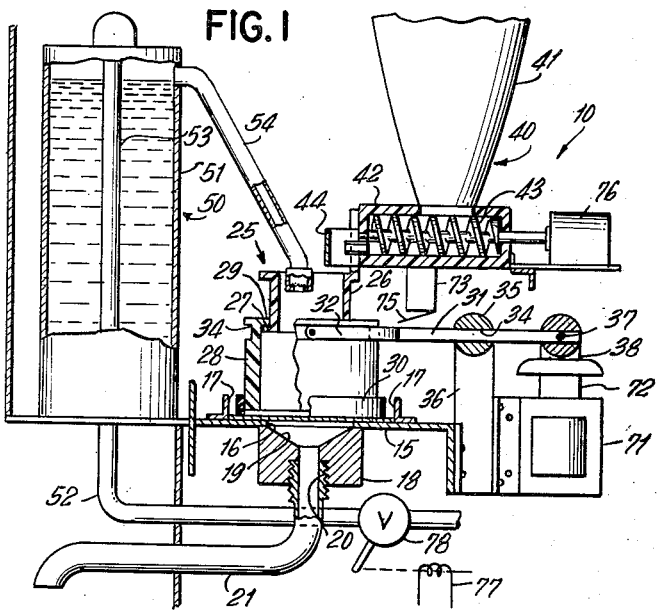
FIGURE 1 is a side elevation, shown partly in section, of a machine constructed in accordance with my invention.
Figure 2:
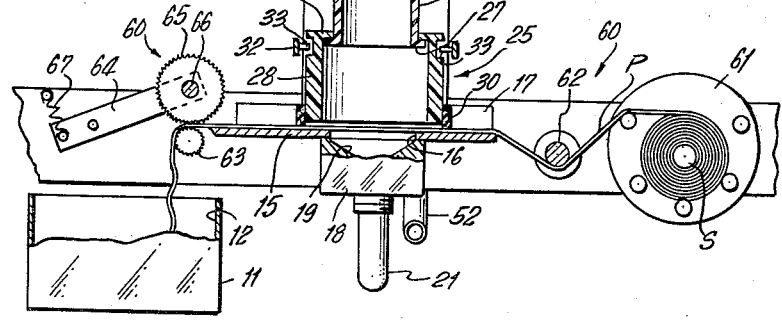
FIGURE 2 is a rear elevation, shown partly in section, of the machine shown in FIGURE 1.
Figure 6:
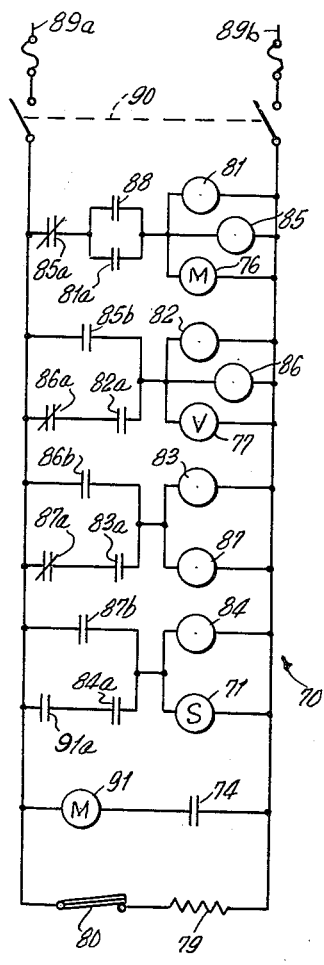
FIGURE 6 is an electrical diagram illustrating electrical circuit of the machine shown in FIGURES 1 and 2.

Having reference particularly to FIGURES 1 and 2, the reference numeral 10 generally designates a machine suitable for brewing coffee, tea and the like in accordance with my invention which basically includes a filter paper and brewing receptacle support plate 15, a brewing receptacle 25, a coffee feeding device 40, a water heater 50, a filter paper feed mechanism 60 and a control circuit 70 (see FIGURE 6).

In machine 10 support plate 15 is an elongated (as seen in FIGURE 2) plate constructed of stainless steel or similar material mounted in horizontal position which is centrally provided with an aperture 16. Along each side plate 15 is provided on its upper surface with a stainless steel angle 17, each of which is screwed or otherwise fastened to plate 15 forming ways which are parallel on each side of aperture 16 along the length of plate 15. A bin 11 for receiving used materials having an upper opening 12 is positioned beneath plate 15 with its opening 12 below one end of plate 15 (left end in FIGURE 2). Beneath aperture 16 on the underside of plate 15 there is secured to plate 15 a block 18 which at its upper end has a conical bore 19, the upper side end of which registers with aperture 16. The lower end of block 18 is provided with a small-diameter, tapped bore 20 which at its upper end is connected with the apex of conical bore 19 and at its lower end threadedly receives a discharge spot 21, the outlet end of which extends forwardly through the front wall of machine 10.

Receptacle 25 in the illustrated case includes basically two parts: The first is a vertical, cylindrical, open-ended guide sleeve 26 which is mounted spaced above plate 15 with its ends vertically registered over aperture 16. At its lower end sleeve 26 is provided with an exterior annular flange 27. The second basic part of receptacle 25 is a vertical, cylindrical, open-ended short tube 28 which at its upper end is provided interiorly with an annular flange 29. Bother guide sleeve 26 and tube 28 are constructed of polytetrafluoroethylene or acetal resin, and preferably the latter because of its lower cost. Tube 28 has an interior diameter just clearing the outer diameter of flange 27 on sleeve 26, while the outer diameter of sleeve 26 itself is just cleared by the inner diameter of flange 29 and tube 28 is positioned with its upper end receiving sleeve 26, flange 29 being just above flange 27. Thus, tube 28 can be moved vertically a distance just less than the length of sleeve 26. The lower end of tube 28 is provided with a foot 30 in the form of a rubber or neoprene ring tightly fitted about the lower end of tube 28 and extending just below it. When tube 28 is in its lowermost position with flanges 27 and 29 abutting foot 30 rests on the upper surface of plate 15 encircling aperture 16.

Tube 28 is further provided with a mechanism for moving it vertically on guide sleeve 26 off of plate 15 which mechanism basically includes a solenoid 71 (forming a part of control circuit 70) an arm 31 and a yoke 32 attached to one end of arm 31. At its outer ends yoke 32 is provided with inwardly facing pins 33 which are received on a groove 34 about the upper end of tube 28, grasping tube 28 in a loose, pivotal manner. Arm 31 extends to the rear of tube 28 in an approximately horizontal position and at its center is slidingly received in a transverse bore 34 in a small cylindrical bar 35 mounted in horizontal position pivotally received at its ends in a pair of posts 36 (only one of which is shown) vertically mounted on machine 10 to the rear of plate 15. At its end remote from yoke 32 arm 31 is fixed in a transverse bore 37 in a short cylindrical pin 38 mounted in horizontal position and pivotally secured at its ends to the upper end of the armature 72 solenoid 71, armature 72 being spring biased to an upper position.

It is apparent that the energization of solenoid 71 draws the end of arm 31 remote from yoke 32 down, with bar 35 rotating and providing a fulcrum for arm 31 which slides through bore 34 a short distance, accommodating its arcuate movement, and raising yoke 32 up to lift up to tube 28 off plate 15. Immediately over the end of arm 31 attached to yoke 32 a micro switch 73, having a pair of normally open contacts 74, with its actuating element 75 positioned to be tripped by arm 31, as tube 28 is raised, closing contacts 75.

Coffee feeding mechanism 40 basically includes a hopper 41 mounted above a screw casing 42 and which communicates at its lower end with the interior of screw casing 42. A worm screw 43 is mounted in screw casing 42 extending in a horizontal position. The discharge end of screw casing 42 is located immediately over the open upper end of guide sleeve 26 and is provided with a baffle 44 to deflect materials fed by screw 43 from hopper 41 through the discharge end of screw casing 42 downwardly into receptacle 25. A motor 76 is mounted to the rear of screw casing 42 and has its output shaft connected to drive screw 43 in a direction advancing materials from hopper 41 to the discharge end of screw casing 42.

Water heater 50 includes a vertical, cylindrical tank 51 having a capacity, for example, of two quarts and which is mounted near the front of the machine opposite hopper 41 in respect of receptacle 25. At its lower end tank 51 is provided with an inlet connection 52 which is connected through a solenoid 77 operated valve 78 to a cold water supply system. Interiorly tank 51 is provided with an immersion heater 53 of the electrical resistance-type having a serially connected heating resistor 79 and thermostatic control switch 80 which is normally set to open at a temperature of 180 to 190° F. Typically, resistor 79 should have a power rating of 5,000 to 10,000 watts, and thermostatic element 80 should be located at the lower end of heater 53 which preferably extends downwardly into tank 51 from its upper end. Tank 51 is further provided with an overflow outlet in the form of a pipe 54 leading downwardly from the upper end of tank 51 and terminating immediately over the upper end of sleeve 26.

The filter paper feed mechanism 60 includes a cradle 61 positioned adjacent to and spaced from one end (right end in FIGURE 2) of plate 15 and adapted to receive a roll or spool of filter paper tape and permit the paper to be drawn horizontally across the surface of support plate 15. An idler roll 62 is mounted in horizontal position between cradle 61 and the end of plate 15 with its undersurface slightly lower than the upper surface of plate 15 and lower than the pay-off position of paper in cradle 61.

At the other end of plate 15 (left end in FIGURE 2) and immediately over opening 12 of bin 11, a second idler roller 63 is mounted horizontally spaced a short distance from and extending across the end of plate 15 with the upper surface of roller 63 tangent to the plane of the top of plate 15. The width of roller 63 is approximately equal to the spacing of ways 17, and roller 63 is positioned such that it extends across the distance between ways 17. The ends of idler 63 are splined.

A frame 64 is pivotally mounted intermediate of its ends for rotation about a horizontal axis parallel to the axis of roller 63. One end of frame 64, which is closer to plate 15, is positioned immediately over roller 63 and carries a pair of wheels 65 on a pivotally mounted axle 66 parallel to and over roller 63. Wheels 65 are spaced apart such that peripherally they engage roller 63 at its splined ends and are similarly peripherally splined. The other end of frame 64 is connected by a spring 67 to the structure of machine 10 tending to hold wheels 65 in contact with roller 63, and a motor 91 having its output shaft lying in the fulcrum axis of frame 64 is geared to axle 66 to drive wheels 65 which are affixed to axle 66 in a clockwise direction as seen in FIGURE 2.

Control circuit 70 in addition to including solenoid 71, micro switch 74, motor 76, solenoid 77, heater resistor 79, thermostat 80 and motor 91, previously adverted to, also includes four relays 81, 82, 83 and 84, three timers, the motors of which have been designated by the reference numerals 85, 86 and 87, and a push-button momentary start switch 88 having a normally open pair of contacts and which is preferably mounted on the panel of the front of machine 10 above discharge spout 21.

Each of relays 81, 82, 83 and 84, when energized, closes a pair of normally open contacts designated respectively 81a, 82a, 83a and 84a. Each of the timers 85, 86 and 87 upon timing out opens a pair of normally closed contacts, respectively designated 85a, 86a and 87a, and closes a pair of normally open contacts, respectively designated 85b, 86b and 87b. Upon deenergization of timer motors 85, 86 and 87, each automatically resets itself reclosing its normally closed contacts and reopening its normally open contacts. In addition, motor 91 operates a cam, preferably mounted on axle 66, which holds a pair of contacts 91a normally open in an off or dead position, closing contacts 91a immediately upon actuation of motor 91 for one rotation of wheels 65. Contacts 91a reopen as the cam returns to the dead position. The dead position of the cam, in which contacts 91a are open, should occupy no more than five degrees of the rotation of the wheels 65.

Control circuit 70 includes six basic operating circuits connected between power lines, designated 89a and 89b, which are suitably fused and provided with a master switch indicated as 90. Each such circuit includes a connection between the fused and switch power lines 89a and 89b. The first circuit includes in series normally closed contact 85a, a parallel connection of normally open contacts 88 and of normally open contacts 81a and a parallel connection of relay 81, of timer motor 85 and of feed screw motor 76. The second circuit includes in series a parallel connection of normally open contacts 85b and of a series connection of normally closed contacts 86a and normally open contacts 82a, and a parallel connection of relay 82, of timer motor 86 and of valve solenoid 77. The third circuit includes in series a parallel connection of normally open contacts 86b and of serially interconnected normally closed contacts 87a and normally open contacts 83a, and a parallel connection of relay 83 and of timer motor 87. The fourth circuit includes in series a parallel connection of normally open contacts 87b and of serially interconnected normally open cam operated contacts 91a and normally open contacts 84a, and a parallel connection of relay 84 and of solenoid 71. The fifth circuit includes the series connection of motor 91 and of micro switch contact 74. The sixth circuit includes the series connection of thermostat switch 80 and heater 79.

In operation ground coffee is placed in hopper 41, tank 51 is filled with water (desirably a by-pass about valve 78 is provided for the latter purpose) to the level of outlet 54, and switch 90 is closed to energize the circuits. A spool S of filter paper tape P is placed in cradle 61 and the free end of paper P is fed beneath roller 62 across plate 15 between ways 17 under tube 28 and between wheels 65 and roller 63. Machine 10 is then ready to operate upon the water in tank 51 reaching a temperature of 180 to 190° F.

Figures 3, 4, 5:
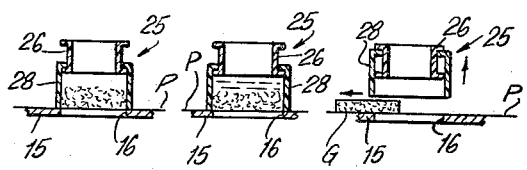
FIGURE 3 is a somewhat diagrammatic, fragmentary view of a portion of the machine shown in FIGURES 1 and 2 illustrating the initial step shown in the operation of the machine.
FIGURE 4 is a view similar to FIGURE 3 illustrating the second step in the operation of the machine.
FIGURE 5 is a view similar to FIGURES 3 and 4 illustrating a further step in the operation of the machine.

To operate the machine, switch contacts 88 are closed by depressing the momentary start switch completing a circuit energizing relay 81 which closes its contacts 81a to shunt contacts 88 and lock the first control circuit up. At the same time, timer motor 85 is energized and motor 76 is energized. Motor 76 causes feed screw 43 to advance coffee from hopper 41 through the discharge outlet of casing 42 into the lower end of receptacle 75 resting over aperture 16 on filter paper P as illustrated in FIGURE 3. Coffee continues to be discharged until timer motor 85 times out, opening contacts 85a breaking the first control circuit energizing motor 76. Typically, about a two-second cycle is employed and the amount of coffee measured out is on the order of one tablespoon. The release of relay 81 at the same time opens contacts 81a preventing the circuit from being reestablished as timer motor 85 upon release resets its contacts 85a.

As timer 85 times out, contacts 85b are momentarily closed energizing relay 82 whose contacts 82 close shunting contacts 85b and locking the second control circuit. At the same time timer motor 86 is energized and solenoid 77 is energized to open valve 78 admitting fresh water to the bottom of tank 51 displacing some hot water to overflow into outlet pipe 54 and thence into receptacle 25. The quantity of water so admitted should be about 7 ounces and is controlled by the timing cycle of timer 86. At this point, referring to FIGURE 4, it will be noted that tube 28 is approximately filled with water and coffee with the infusion mixture being filtered out through paper P, aperture 16 and spout 21 which delivers it to a cup positioned beneath the discharge end of spout 21.

Approximately eight seconds transpire between initiation of operation and completion of the delivery of the coffee. Timer 86, however, should time out in approximately three seconds leaving a further three seconds in the cycle to complete filtration. Thus, as timer 86 times out, the momentary opening of contacts 86a breaks the second control circuit energizing valve solenoid 77. Similarly contacts 86a momentarily close establishing the third control circuit actuating relay 83 and timer 87, relay contact 83 closes to shunt contacts 86b and hold the third circuit. Timer 87 is set for a suitable period to insure delivery of the coffee, for example, three seconds, after which period its contacts 87a open, breaking the circuit and its contacts 87b momentarily close to establish the fourth control circuit actuating relay 84 and solenoid 71. Relay 84 contacts 84a thereupon closes setting up a potential holding circuit shunting contacts 87b.

As solenoid 71 causes arm 37 to raise tube 28 and actuate micro switch contacts 74, the fifth control circuit is completed starting motor 91 and thereby closing contacts 91a which complete the holding circuit for the fourth control circuit. At this point, referring to FIGURE 5, the operation of motor 91 draws filter paper P off spool S by the engagement of the edges of paper P between wheels 65 and roller 63. Typically, the area of filter paper enclosed by the bottom of tube 28 should be on the order of three square inches to deliver a 7 ounce cup of coffee in 8 seconds. The rim length of wheel 65 should be about three inches in this case, such that in one cycle of operation an adequate amount of fresh filter paper will be positioned beneath tube 28 as shown in FIGURE 5. At the same time, of course, the used coffee grounds G, as noted in FIGURE 5, are drawn on filter paper P from beneath tube 28 and ultimately after several cycles of operation grounds G are dropped off roller 63 along with the used filter paper P onto opening 12 of bin 11. As contacts 91a again open after one cycle of operation of wheel 65 the fourth control circuit energizing relays 84 and solenoid 71 is broken and solenoid 71 releases tube 28 which falls back in position on the fresh paper P at the same time opening contacts 74 which breaks and stops the fifth control circuit and stops motor 91 to complete the operating cycle of machine 10.

It will be noted that cold water on each cycle of operation of machine 10 is introduced into the bottom of tank 51. As this water is displaced upwardly thermostatic switch 80 will close the sixth control circuit, when required, to energize heater 79 and assure a continued supply of hot water.

In many circumstances, such as in restaurant usage, where the time consumed to draw off a freshly-brewed cup or pot of coffee is of critical importance, speed of delivery of machine 10 can be improved by replacing spout 21 with a relatively large receiver, for example, on the order of 40 ounces capacity and by increasing the brewing capacity of the machine through enlargement of receptacle 25 to, for example, 20 ounces. In this arrangement the receiver, which desirably is heated by an immersion heater similar to heater 53, is provided with a level indicator which will momentarily close a normally open switch as the level in the receiver drops to, for example, 20 ounces. Such switch then replaces push-button switch contacts 88 and the bottom of the receiver is provided with a conventional spigot. Thus, a pot of coffee can be withdrawn from the receiver as rapidly as the brewed coffee can flow through the spigot, and as the level of the receiver drops to 20 ounces, it is recharged assuring relatively rapid and fast delivery of quantities in varying amounts within the capacity of the receiver.

It should also be mentioned that in the interest of good quality coffee some consideration should be made in selecting the filter paper employed. The filter paper must be made from a high-quality pulp, have good wet strength to retain the finely ground coffee, yet filter by gravity approximately 8 ounces of coffee at 190° F. in a maximum of 15 seconds through a 3-square inch area. The paper should be stabilized with a taste-free combination of hydrophobic and hydrophilic resins to prevent fibre swelling. The resins must not leach from the paper when subjected to coffee at 190° F. for 5 minutes. A suitable filter paper meeting the foregoing requirements has been obtained from H. Reeve Angel & Co., Inc. at Clifton, New Jersey.

I claim:

1. A machine of the class described which includes means defining a flat supporting surface having an aperture therethrough, a receptacle having an open bottom positioned on said surface with said open bottom over said aperture, said receptacle thereby enclosing said aperture, means connected to said receptacle for moving said receptacle between said position and a position spaced away from said surface, means for drawing a tape across said surface over said aperture and under the open bottom of said receptacle, means communicating with the upper end of said receptacle for introducing liquid materials thereinto, and means communicating with the upper end of said receptacle for introducing solid materials thereinto.

2. A machine of the class described which includes a horizontal plate defining a flat supporting surface and having a discharge aperture therethrough, a tube mounted for vertical reciprocation between a first position having its open bottom on said plate with said receptacle thereby enclosing said aperture and a second position raised above said plate, means connected to said receptacle for reciprocating said receptacle between said first position and said second position, a tape of filter paper positioned on said plate over said aperture and under the open bottom of said receptacle, means for drawing said tape across said plate, means communicating with the upper end of said receptacle for introducing liquid materials thereinto, and means communicating with the upper end of said receptacle for introducing solid materials thereinto.

3. A machine of the class described which includes means defining a flat supporting surface having an aperture therethrough, a receptacle having an open bottom positioned on said surface with said open bottom over said aperture, said receptacle thereby enclosing said aperture, first means connected to said receptacle for moving said receptacle between said position and a position spaced away from said surface, second means for drawing a tape across said surface over said aperture and under the open bottom of said receptacle, third means communicating with the upper end of said receptacle for introducing liquid materials thereinto, fourth means communicating with the upper end of said receptacle for introducing solid materials thereinto, and control means operable in sequence to operate said fourth means to introduce a predetermined amount of solid material into said receptacle with said receptacle in said position on said surface, to operate said third means to introduce a predetermined amount of liquid into said receptacle, to operate said first means to move said receptacle to said position away from said surface, to operate said second means to draw said tape across said surface a predetermined amount and to operate said first means to move said receptacle to said position on said surface over said aperture.

References Cited in the file of this patent

UNITED STATES PATENTS

| | | |
|---|---|---|
| 1,837,252 | Carter | Dec. 22, 1931 |
| 1,837,368 | Medin | Dec. 22, 1931 |
| 2,392,452 | Baumann | Jan. 8, 1946 |
| 2,879,811 | Parraga | Mar. 31, 1959 |
| 2,939,380 | Parraga | June 7, 1960 |